Stanley E. Jaros — Inventor

United States Patent Office 2,821,515
Patented Jan. 28, 1958

2,821,515

METHOD OF INCORPORATING OIL IN BUTYL RUBBER

Stanley E. Jaros, Watchung, N. J., assignor to Esso Research and Engineering Company, a corporation of Delaware Application January 11, 1955, Serial No. 481,077

8 Claims. (Cl. 260—33.6)

This invention relates to polymerization processes and apparatus and particularly to processes and apparatus for the low temperature polymerization of iso-olefins or mixtures of iso-olefins and diolefins. In a more specific aspect, the invention relates to the modification and/or plasticization of iso-olefin polymers produced at low temperatures.

Certain preferred details of the process and apparatus will be apparent and the invention itself will be best understood by reference to the following specification and accompanying drawing.

It has been known for some time that high molecular weight polymers, i. e. having a molecular weight of from about 15,000–25,000 up to 300,000 or more (as determined by the Staudinger method), are obtained if iso-olefins, such as isobutylene, are contacted with Friedel-Crafts type catalyst such as aluminum chloride and the like at temperatures below about −10° F. (See, for example, Mueller-Cunradi U. S. Patent No. 2,203,873, issued June 11, 1940.) Later it was found that a copolymer which is curable with sulfur is obtained if a mixture of about 70 to 99.5 weight percent of an iso-olefin such as isobutylene with about 30 to 0.5 weight percent of a conjugated diolefin such as butadiene or isoprene is treated with a solution of a Friedel-Crafts type catalyst such as aluminum chloride in a non-complex forming, low-freezing solvent such as methyl or ethyl chloride and at temperatures of between −10° F. and −250° F., preferably between −20° F. and −150° F. (see, for example, Australian Patent No. 112,875, issued July 31, 1941). Copolymers of iso-olefins with aromatic hydrocarbons, having unsaturated side chains, such as styrene may also be formed at these low temperatures. These polymerizations have been conducted in the presence of an internal refrigerant such as liquefied ethylene, in which case the heat of reaction is removed directly by evaporation of part of the ethylene without the necessity for transferring heat through the surfaces of the reaction vessels or through cooling coils arranged in the reaction vessels, or in the presence of large quantities of a diluent such as methyl chloride, cooled by external means. Consequently, the reaction is now carried out in such a manner as to keep the solid polymer particles in a finely divided condition suspended in the cold reaction mixture so that a slurry of solid polymer in the cold reaction mixture is obtained which can be handled at low temperature. In view of the volatile nature of certain of the reactants and diluents, the slurry is discharged into a well-agitated body of a heated liquid medium, such as water, which may be designated as the flashing medium in which the polymer is suitably insoluble and which is maintained at a temperature well above the boiling point of the majority of the volatile materials accompanying the polymer, to form a slurry of small polymer particles in the warm liquid and to flash off the reaction mixture. This slurry is then stripped of any residual volatile materials and dried while being conveyed through a tunnel on a screen or on sections of a perforated plate in the presence of warm air. The polymer is then passed to a mill where it is worked into a compact sheet for further processing as desired. It is at this point that extenders, such as naphthenic-type or aromatic-type oils, are added to lower the internal viscosity and provide a rubber of good elasticity and at the same time lower the cost of the compound. However, this method of incorporation of the extender oil involves high energy expenditure and considerably increases manufacturing time or the number of mills or extruders required. Up to the present time there has been no other alternative to the above-described procedure since butyl rubber is not prepared from a latex as are GR–S and other synthetic rubbers which are prepared in an emulsion process. Since the reactor mixture is a slurry and not a solution, and the temperature is very low, there is a problem in getting a homogeneous mixture of extender oil and polymer. The oil cannot be added to the feed since it has a detrimental effect on the polymerization. Introduction of the oil into the flash tank is not feasible because the wet polymer particles do not imbibe the oil readily, so that free oil is present with the result that the polymer particles stick together and cause difficulty in the flash tank as well as subsequent finishing operations. Introduction of the oil directly into the reactor overflow is also not feasible since the oil coagulates the cold slurry, thickens drastically, or even solidifies at the low temperature and thus does not go into solution in the polymer.

It has now been found that the above difficulties can be overcome and the oil easily incorporated into the rubber, thus simplifying finishing operations, by first dissolving the oil in a diluent, e. g. methyl chloride, ethyl chloride, methylene chloride, ethylene, butane or pentane, cooling the solution to substantially reactor temperature, and mixing this solution or emulsion with the reactor slurry before it is admitted to the flash tank system. Preferably the diluent used is the same as the polymerization diluent in order to simplify solvent recovery processes. The oil solution may even be mixed with the reaction mixture while it is being added to the hot water providing this is done before the reaction mixture comes in contact with the water. This may be accomplished by adding the chilled oil solution to the reactor in the transfer line between the reactor and the flash tank so that oil deposits on the individual particles in the cold slurry before the aggregation caused by flash vaporization of the liquid reactor effluent. Preferably there should be some positive mixing action of the cold oil solution and the cold polymer slurry. This might be effected by the use of a suitable mixing jet in the transfer line or a small mixing chamber provided with a mechanical stirrer. The cold slurry might be stabilized by adding a catalyst poison, such as alcohol, or $NH_3$ so as to minimize coagulation in the mixing zone. A particularly effective means for adding the extender oil to the slurry is to add it to the stubby overflow line disclosed and claimed in U. S. Patent 2,504,488 issued April 18, 1950.

Broadly, the present invention consists of the steps of preparing a reactive mixture of the desired olefinic material at the desired low temperature, as taught in the Thomas and Sparks Patent 2,356,127 and Sparks Patent 2,356,128; generally it is desirable to use iso-olefins having not more than about 7 carbon atoms, the reaction material being preferably isobutylene, either with or without a diolefin such as butadiene, or isoprene, or 2,3-dimethylbutadiene-1,3; or with piperylene or a non-conjugated diolefin such as 2-methyl hexadiene-1,5; 2,6-dimethyl hexadiene-1,5; or triolefins such as hexatriene, myrcene, 1,6-dimethyl heptatriene-1,3,5 and 2,4,6-trimethyl-1,3,5-hexatriene or other olefins having a plurality of double bonds; and cooling the mixture by internal or external refrigeration, e. g. by liquid ethylene, to a temperature ranging from —40° C. to —100° C. or as low as —160° C. To this mixture there is then added a Friedel-Crafts type active halide catalyst, which may be aluminum chloride in solution in an inert low-freezing solvent or may be other similar active halide catalyst materials. This polymerization reaction is conducted under conditions to give a finely pulverulent form of polymer or interpolymer particles, which is highly desirable in order to permit the maximum speed of processing the solid polymer in subsequent operations.

When the polymerization reaction has reached the desired stage of completion, it is passed to a flash tank containing warm water which volatilizes out most of the volatile components and, at the same time, deactivates and washes out much of the deactivated catalyst. The polymer is maintained in a form which is easy to pump by the addition to the warm water, prior to or simultaneously with the addition of the polymer thereto, of a suitable dispersing agent.

According to the present invention, therefore, a solution of oil in a suitable solvent is added to the transfer line between the reaction zone and the flash zone, preferably with agitation and at least a short residence time.

Certain preferred details of construction together with additional objects and advantages will be apparent and the invention itself will be best understood by reference to the following specification and to the accompanying drawings wherein.

Figure 1:
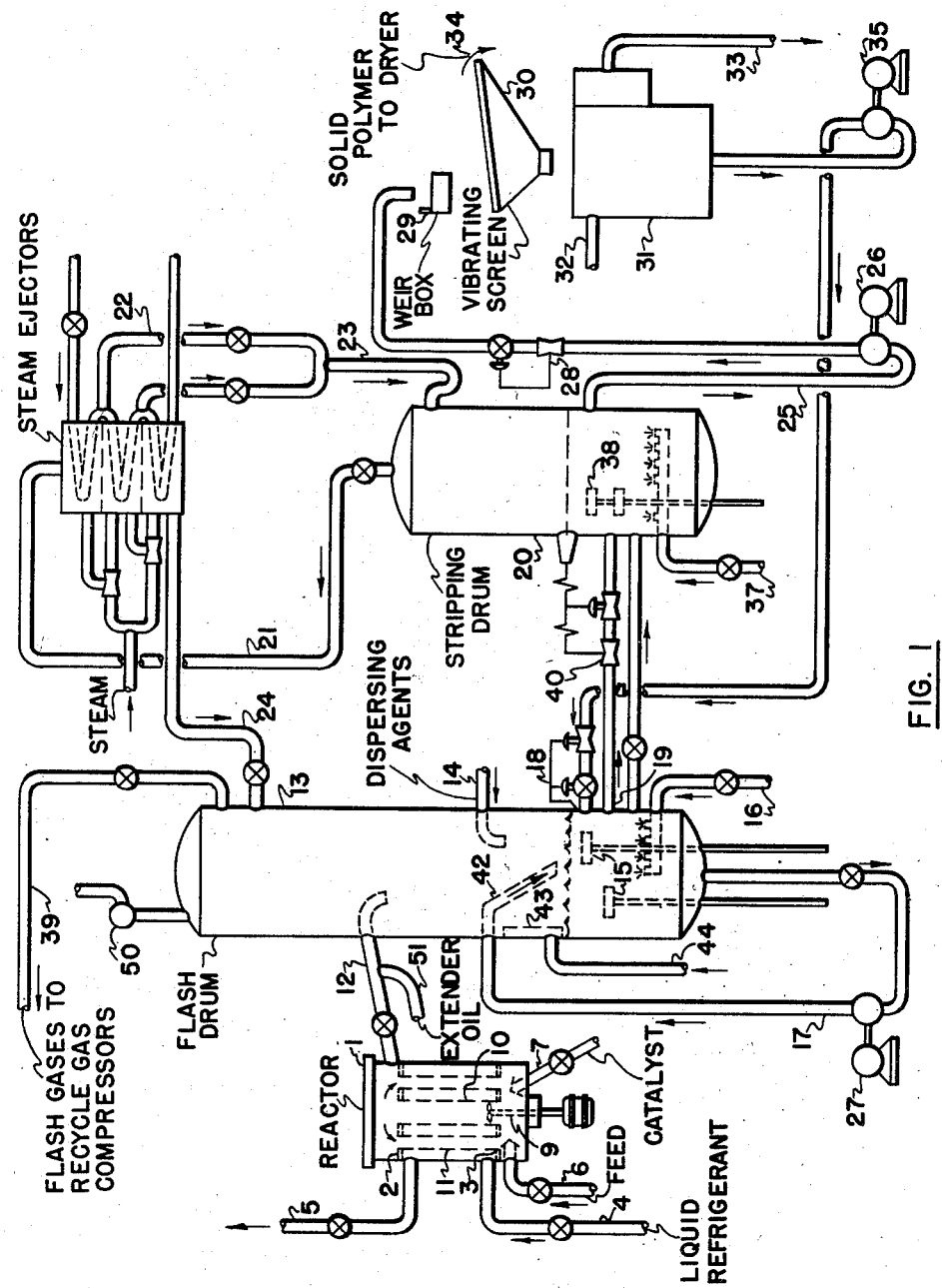
Figure 1 is a diagrammatic view of an apparatus suitable for carrying out the invention.

Referring to the drawings, the polymerization equipment consists of a tube bundle type of reactor 1. No internal refrigerant is used, all the heat of reaction being transferred through the reactor walls to an external refrigerant. The liquid refrigerant, suitably ethylene, is introduced into the space between tube sheets 2 and 3 through line 4, while vaporized refrigerant leaves the said space through line 5. Precooled reactant mixture of iso-olefin and diolefin enters the reactor through line 6. The polymerization mixture desirably consists of from about 60 to 99.5 weight percent of an iso-olefin having from 4 to 8 carbon atoms per molecule, isobutylene being the preferred material; and from 40 to 0.5 weight percent of a diolefin. The diolefin may be butadiene or may be substantially any of the substituted butadienes up to those having from 10 to 12 carbon atoms per molecule. Preferred diolefins are isoprene, piperylene and dimethyl butadiene. Alternatively, the non-conjugated diolefins, such as dimethylallene, or the triolefins, such as myrcene, having up to 10 or 12 carbon atoms per molecule, may also be used. The polymerization mixture contains in addition from 100 parts to 700 or more parts of a diluent such as methyl chloride, ethyl chloride, n-butane, isobutane, carbon disulfide, ethylidene difluoride, etc. The liquid ethylene as external refrigerant cools the mixture to a temperature between —90° C. and —103° C. Catalyst solution is added through line 7 provided with a suitable dispersing nozzle.

The catalyst conveniently consists of a solution of a Friedel-Crafts type catalyst such as aluminum chloride, in solution in a noncomplex-forming, low freezing solvent such as ethyl or methyl chloride or carbon disulfide or other mono- or poly-halide containing up to 3 or 4 carbon atoms per molecule or other noncomplex-forming solvent which is liquid at temperatures below about —30° C.

The reactant mixture is thoroughly agitated by impeller type agitator 9, so that a circulation of the reacting mixture is produced up through central tube 10 and down through a plurality of peripheral smaller tubes 11, set between tube sheets 2 and 3. The reaction proceeds promptly to form a slurry of solid polymer particles in the diluent and unreacted olefinic components. In those cases in which no diluent is used the polymer forms as a highly dispersed gel in the cold reactant liquid. When a hydrocarbon, such as n-butane, is used as a diluent, the polymer forms a solution in the hydrocarbon. The rate of catalyst delivery with respect to the rate of delivery of fresh reactants is preferably adjusted to such a relationship that the proportion of solid polymer in the reacted mixture is less than about 30%. The polymerization reaction being exothermic, heat is liberated as the polymer forms, which is removed by the liquid ethylene in the space between sheets 2 and 3. The reactor is maintained essentially full of liquid, a mixture of relatively finely divided polymer and excess unreacted hydrocarbons plus diluent overflowing from the reactor through line 12 in amount corresponding to the material fed to the reactor through lines 6 and 7 at a velocity of between 1 and 3 ft. per second, discharging into flash drum 13 in a downward direction. Line 12 may be tilted upward as shown to provide an effective liquid seal on the reactor. At this point, in accordance with the present invention, a solution of hydrocarbon extender oil in the reaction diluent or other diluent is introduced into line 12 through line 51. The oil is added in a solvent to give rapid dissolution in the reactor effluent liquid and to prevent freezing of the oil. The amount of solvent should be about the same or more than the amount of oil used. The oil should be well mixed with the solvent prior to addition to the polymerization mixture but it need not be entirely dissolved if undissolved particles be finely divided, such as a minor portion of wax in a paraffinic oil. The oil to be used is, of course, that which is most desirable for incorporation in the finished rubber. This might be naphthenic or aromatic, or even paraffinic, depending on what rubber properties are desired. The oil solution preferably should be precooled to avoid coagulating the cold slurry. Some oils may not be completely soluble in the diluent at low temperatures so that a very finely dispersed emulsion is formed. However, this is immaterial since the extremely small particles of oil are readily absorbed by the very small particles of polymer in the cold slurry due to the large surface available.

Figure 2:
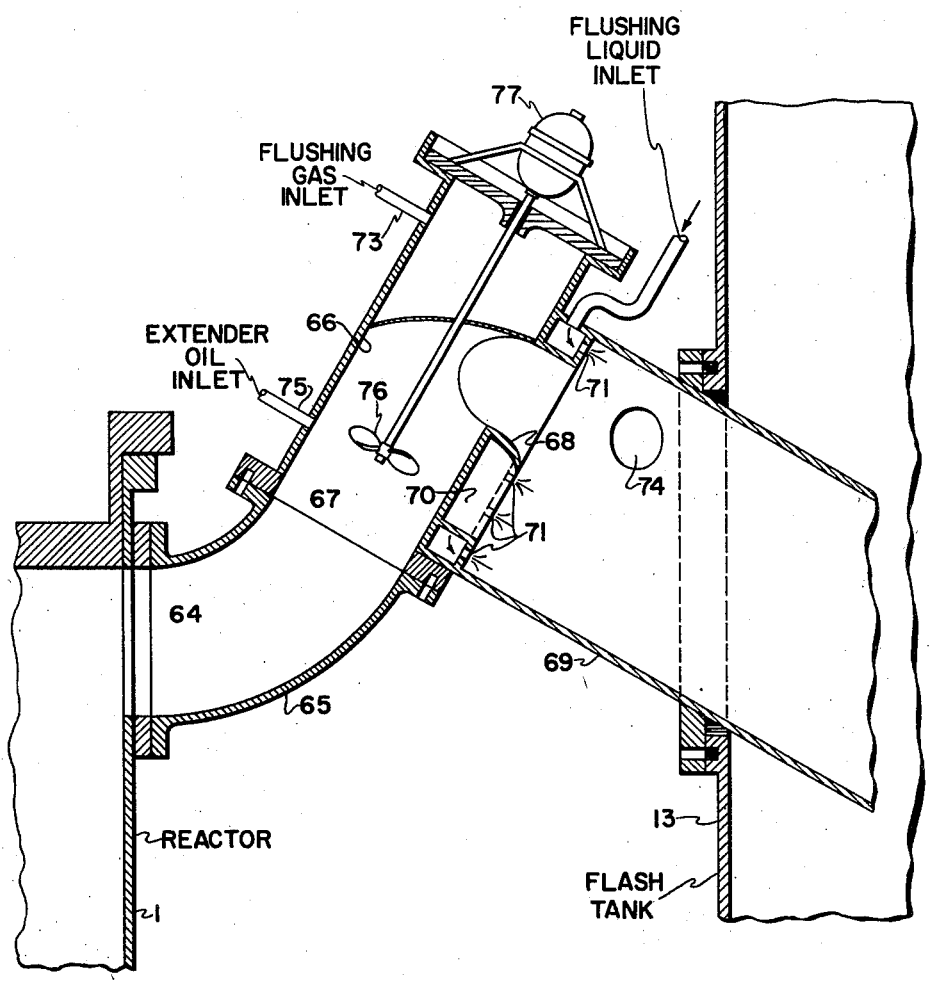
Figure 2 is a vertical cross-section through an overflow particularly suited to the invention.

A particularly suitable method for mixing the extender oil with the polymer slurry is shown in Figure 2. In this embodiment an outlet 64 is arranged at the top of the reactor side wall and comprises a pipe 65 extending upwardly and connecting with an overflow section 66. The overflow section 66 comprises a tubular lower part or pipe 67 which terminates in a weir 68 which extends into a large diameter flash pipe 69. A manifold 70 is arranged at the inlet end of the flash pipe 69 and is connected with a source of heated flashing liquid, preferably water. The manifold is perforated or slotted as at 71 in such a way as to eject a spray or sheet of flashing liquid over the surface of pipe 69. The pipe 69 is sloped downwardly towards the flash tank proper 13, the discharge end of the pipe 69 extending well inside the flash tank.

Inlet pipe 75 is placed at the lower part of overflow section 66 for the introduction of the extender oil. An agitator 76 driven by a motor 77 is shown in the discharge pipe for effective mixing of the extender oil with the slurry before it is discharged into the flash tank. An inlet 73 is provided in the overflow pipe 66 for the supply of flushing gas in order to sweep the volatilized materials out of the overflow and flashing pipes. A manhole 74 is arranged in the flash pipe 69 in order that the flow of reaction mixture may be readily observed, and easily reached in the event that the weir becomes fouled with polymer and cleaning or scraping becomes necessary. During the flashing of methyl chloride and unreacted monomers, the agglomerated slurry particles pick up zinc stearate as a protective anti-tack film to maintain the water slurry of the oil-extended polymer in water.

Flash tank 13 is a relatively large vessel designed to withstand mild pressure surges, of the order of 1–10 lbs./sq. in. having a relatively large vapor space, providing preferably several minutes nominal holdup of the vapors in the flash tank. The tank is supplied with water or other suitable liquid maintained at a suitable level by means of level control valve 18 which controls the rate of introduction of water to the flash tank. The water slurry is maintained at a suitably elevated temperature level, for example at 100° to 180° F., by means of steam injected through pipe 16 and is kept well agitated by means of turbine type agitators 15. In order to prevent the polymer from agglomerating and to produce a finely divided slurry and in order to simplify the finishing operation, a dispersing agent is introduced into the flash tank by line 14. Suitable dispersing agents comprise water insoluble soaps of fatty acids having 16 to 18 carbon atoms per molecule and magnesium, zinc, aluminum or calcium, e. g., zinc stearate.

The polymer and cold liquid falling from line 12 is caught by a rapidly moving sheet of water from line 17 and pump 27 discharging through jet 42 and directed at the center of the surface of the water in the flash tank. For this purpose a 1.5" x 7" rectangular nozzle may be advantageously used for a water flow of around 400 gallons per minute. To protect the tank from sharp thermal shock in case of failure of the water jet a skirt or baffle 43 is provided, a small amount of steam being admitted behind it through line 44. In this way, provision is made for warming up the polymer and volatilizing the liquids without the cold slurry contacting the walls of the flash tank.

The warm liquid, e. g. water, volatilizes out most of the volatile components and at the same time deactivates and washes out much of the deactivated catalyst. Steam is supplied to the flash tank water at 16, to replace the heat lost due to vaporization of the unreacted materials. The polymer tends to float upon the surface of the water but it is kept from doing this by the agitators 15. In general, the polymer contains less than 1%, usually less than 0.1%, of volatile hydrocarbon materials.

The vapors leave the flashing zone through line 39 and are fed to compression, drying, liquefaction, and distillation equipment for recovery and return to the reaction zone. The slurry of polymer in water leaves the flashing zone through line 19 and control valve 40 and passes into stripping vessel 20 wherein a suitable subatmospheric pressure is maintained. The purpose of this stripping zone is to complete as far as possible removal of volatile materials from the polymer and from the water. In this way, loss of valuable reactant or diluents is minimized, as are fire and other hazards. In addition to the removal of these volatile materials from the polymer, the stripping operation when combined with properly controlled hot air drying in a through-circulation, tunnel-type dryer, makes it possible to achieve essentially complete degassing.

A constant level is held in the stripping zone as well as in the flashing zone. The stripper level actuates control of the rate of flow of slurry from the flashing zone to the stripping zone by control valve 40 and the liquid level in the flashing zone controls the return of water to said flashing zone from the vibrating screen pump by means of control valve 18. In this way a minor upset in flow in any part of the system is less likely to cause improper levels to be held in either of the two zones. It is important to maintain the proper level, since too low a level results in exposure of agitators 15, and thus loss of agitation, while too high a level increases the volume of liquid being agitated and hence decreases agitation per unit volume to the extent that considerable settling of the polymer to the surface tends to occur. The stripping vessel is, like the flashing vessel, provided with an agitator 38, a steam injector 37, and a vapor outlet 21. The pressure in the stripping zone is maintained at about 2 to 5 lbs./sq. in. abs. by means of a 2-stage steam injector 22, which embodies condensers before and after each ejector stage. The condensate from the low pressure stages is returned to the stripper through leg 23 while the recovered vapors are sent to the flashing zone, through line 24. The slurry leaves the stripper through line 25 with the aid of pump 26 at a rate controlled by flow controller 28 and passes into weir box 29 from which it is distributed over vibrating screen 30. Excess water drains through the vibrating screen into tank 31, the moist polymer discharged from the end of vibrating screen at 34 containing a substantial percentage of water. The moist polymer is supplied to an endless screen passing through a tunnel dryer of the through-circulation type in which hot air is recirculated over steam coils and down through a bed of material on the screen. Fresh air enters at the discharge end of the tunnel and moist air is exhausted to the atmosphere at various points along the dryer. Drying temperatures of up to about 340° F. are utilized and these conditions of good contact of the rapidly moving air stream with finely divided polymer suffice to drive off residual volatile materials which would ordinarily give rise to blister formation during vulcanization if they were not removed. Water draining through vibrating screen 30 into tank 31 is returned to the flash tank 13 by means of pump 35 and flow controller 18 in order to save water, slurry dispersing agents, and any other valuable materials contained therein.

Tank 31 is provided with fresh water makeup 32 and a water overflow 33 to provide for purging any undesirable accumulations. It will be noted that flow controllers shown in slurry lines utilize a Venturi meter instead of the usual orifice type of meter as the measuring device in order to avoid plugging by the solid polymer particles. The control valves are also of a special streamlined design which are not readily plugged by solid material. In order to take care of any large surges in pressure as may occur if a large slug of polymer or of reaction mixture should strike the water in the tank, a suitable safety valve 50 may be provided on the flash chamber.

The operation of the invention is as follows: liquid ethylene is circulated through the cooling jacket of the reactor as well as the cooling jacket in the discharge pipe if one is provided. Reaction mixture comprising about one part of a 97.5% isobutylene and a 2.5% isoprene mixture in from about three to ten parts of methyl chloride is supplied continuously to the reactor and circulated therein. Catalyst solution comprising about 0.15% of $AlCl_3$ dissolved in methyl chloride is introduced into the reaction mixture continuously. At the same time a solution of equal volumes of an acid-treated distillate or other extender oil at a temperature near that of the slurry is introduced into the overflow 66 through line 75. The mixture is agitated thoroughly and after a short residence time in the overflow a slurry of polymer particles in reaction mixture continuously flows out of the reactor through the overflow pipe and over the weir. A hot flashing liquid, preferably water at about 150° F., is supplied to the manifold and is sprayed as a fast moving (20 ft. per second or greater) stream onto the inner surfaces of the flash pipe. The cold slurry of polymer in reaction mixture flows over the weir and hits the fast moving stream of hot water which vaporizes unreacted materials and disperses the polymer as a finely divided slurry. The polymer is carried down through the flash line into the main flash tank which contains a substantial quantity of water which is thoroughly agitated by means of suitable stirring or agitating devices and which is heated as by direct introduction of steam in order to flash off any residual volatile materials that may be associated with the polymer. The water slurry of polymer is then, if desired, subjected to a vacuum stripping operation, dewatered and the polymer dried in the usual way.

Example

A cold polymer slurry was prepared by batch polymerization of a typical mixture composed of:

2400 ml. of methyl chloride
800 ml. of isobutylene (97 parts by wt.)
22.4 ml. of isoprene (3 parts by wt.)

Catalyst (0.25 gram of aluminum chloride per 100 ml. of methyl chloride) was added at a rate of 15 ml. per minute for 15 minutes to this cold feed (—102° C.). This produced a slurry of 14.6 grams of polymer per 100 ml. of reactor effluent which is approximately 90% conversion. An aliquot portion of this cold slurry was removed and the polymer recovered with no added oil or zinc stearate. This was designated as polymer A. A mixture of an acid-treated distillate having the following properties:

| | |
|---|---|
| Viscosity, S. S. U., at 100° F | 107 |
| Viscosity index | 82 |
| Gravity, API | 29 |
| Unsulfonated residue (ASTM), percent | 83 |
| Pour point, ° F | 30 | and known by the trade name of Forum 40 (Technigram—Farm Edition—October 22, 1948) and about equal volume of methyl chloride was made at —24° C. This oil mixture was added to the cold polymer slurry with stirring (at —102° C.) to give a mixture containing 15% of oil based on the polymer present. Some of this cold slurry was poured into a tank of agitated hot (160° C.) water containing some zinc stearate to flash off methyl chloride and unreacted monomers. The resulting slurry of oil-extended polymer was good and did not agglomerate after six days. The polymer from this contained 15% oil and was designated as polymer B. To the remaining cold slurry was added more oil and methyl chloride mixture to give 30% oil based on the polymer. This was flashed as in the above case and formed a good water slurry. The polymer particles were somewhat tacky and required more zinc stearate than in the 15%-oil case to maintain a good water slurry. The polymer from this slurry containing 30% oil was designated as polymer C.

Subsequent testing showed that these polymers could be easily handled on a hot or cold mill. The Mooney viscosities of the polymers after removal of water by hot milling in the presence of a small amount of phenyl-beta-naphthylamine stabilizer were:

| Polymer | Percent Oil | Mooney Viscosity at— | |
|---|---|---|---|
| | | 1.5 min. | 5 min. |
| A | None | 78 | 78 |
| B | 15 | 51 | 45 |
| C | 30 | 34 | 32 |

The Mooney viscosity of the resulting polymer is dependent upon the type of oil as well as percent of oil employed.

There is a distinct advantage in the incorporation of oil into butyl rubber by this invention over the conventional addition of oil during compounding. The rate of dissolution of oil into high molecular weight hydrocarbon polymer like butyl rubber is slow. When oil is added during compounding, there is competition between the oil and the polymer for adsorption on the surface of the carbon black or reinforcing agent. The small mobile molecules of oil readily adsorb on the black before they can dissolve in the polymer. A desorption of the oil must then take place so that the oil may dissolve in the polymer and allow a strong adsorption bond to occur between the polymer and the black for best reinforcement. These processes are speeded to equilibrium of prolonged heat treatment and mixing at high temperatures. But, by having the oil completely dissolved in the polymer before compounding is begun, these processes are minimized so that the homogeneous true solution of oil in butyl can be mixed with other compounding ingredients and mixing can be accomplished without oil-solvation problems. At the same time, efforts can be directed toward the preparation and utilization of higher molecular weight polymers than where heretofore considered practical since molecular weight breakdown during finishing is minimized. This increase in molecular weight of the polymer gives improved vulcanizates which are superior in their properties, particularly abrasion resistance.

The nature of the present invention having been thus fully set forth and specific examples of the same given, what is claimed as new and useful and desired to be secured by Letters Patent is:

1. The process which comprises polymerizing isobutylene at a temperature between —40° C. and —160° C., in contact with a Friedel-Crafts catalyst dissolved in an organic non-complex forming solvent which is liquid at the reaction temperature, to form a polymer, mixing said polymer with a solution of an extender oil in a diluent, discharging said polymer into water heated to a temperature of 100° to 180° F. and containing a water-insoluble soap of a fatty acid having 16 to 18 carbon atoms per molecule and a metal selected from the group consisting of magnesium, zinc, aluminum and calcium in order to flash off the volatile reaction liquid and maintain the polymer in finely divided form, separating the polymer particles from the water, withdrawing the volatilized materials, subjecting the volatilized materials to a recovery treatment and recycling the recovered material to the polymerization.

2. The process which comprises polymerizing isobutylene at a temperature between —40° C. and —160° C., in a diluent which has 1 to 4 carbon atoms per molecule and is liquid at the polymerization temperature, in contact with a Friedel-Crafts catalyst dissolved in an organic non-complex forming solvent which is liquid at the reaction temperature to form a slurry of solid polymer particles in cold reaction liquid, adding to said slurry a precooled solution of an extender oil in a diluent, discharging said slurry into well-agitated water heated to a temperature of 100° to 180° F. and containing a water-insoluble soap of a fatty acid having from 16 to 18 carbon atoms per molecule and a metal selected from the group consisting of magnesium, zinc, aluminum and calcium in order to flash off the volatile reaction liquid and form a slurry of finely divided polymer particles in water, and separating the polymer particles from said water slurry.

3. A process according to claim 2 wherein the diluent is a hydrocarbon having 1 to 4 carbon atoms per molecule.

4. A process according to claim 2 wherein the diluent is an alkyl halide having less than 3 carbon atoms per molecule.

5. The process which comprises copolymerizing isobutylene and a conjugated diolefin having 4 to 10 carbon atoms per molecule at a temperature between —40° and —160° C. with a Friedel-Crafts catalyst dissolved in an organic non-complex forming solvent which is liquid at the reaction temperature to form a solid polymer, mixing said polymer with a precooled solution of an extender oil in a diluent, discharging the polymer into well-agitated water heated to a temperature of 100° to 180° F. and containing a water-insoluble soap of a fatty acid having 16 to 18 carbon atoms per molecule and a metal selected from the group consisting of magnesium, zinc, aluminum and calcium in order to flash off the volatile reaction liquid and form a slurry of finely divided polymer particles in water, and separating the polymer particles from said water slurry.

6. The process which comprises copolymerizing one part of a mixture consisting of 60 to 99.5 weight percent of isobutylene and 40 to 0.5 weight percent of a conjugated diolefin having 4 to 6 carbon atoms per molecule in up to 10 parts of a suitable diluent which has 1 to 4 carbon atoms per molecule and is liquid at the reaction temperature by adding thereto a solution of an aluminum halide catalyst in a low-freezing, non-complex forming solvent, which solution is liquid at the reaction temperature, to form a slurry of solid polymer particles in reaction liquid at a temperature between −40° C. and −160° C., withdrawing the slurry from the reaction zone, mixing it with a precooled solution of an extender oil in the reaction diluent, and discharging it into well-agitated water heated to a temperature of 100° to 180° F. and containing a suspension of zinc stearate in order to flash off the volatile reaction liquids and to form a slurry of finely divided polymer particles in water, and separating the polymer particles from said water slurry.

7. The process which comprises polymerizing one part of a mixture consisting of 60 to 99.5 weight percent of isobutylene and 40 to 0.5 weight percent of isoprene in up to 10 parts of a suitable diluent which has 1 to 4 carbon atoms per molecule and is liquid at the reaction temperature, by adding thereto a solution of Friedel-Crafts catalyst in a low-freezing, non-complex forming solvent which solution is liquid at the reaction temperature to form a slurry of solid polymer particles in reaction liquid at a temperature between −40° C. and −160° C., withdrawing the slurry from the reaction zone, mixing it with a precooled solution of an extender oil, discharging it into well-agitated water heated to a temperature of 100° to 180° F. and containing zinc stearate in the reaction diluent, in order to flash off the voltatile reaction liquids and form a slurry of finely divided polymer particles in water and separating the polymer particles from said water slurry.

8. The process which comprises polymerizing one part of a mixture consisting of 60 to 99.5 weight percent of isobutylene and 40 to 0.5 weight percent of a conjugated butadiene hydrocarbon having 4 to 6 carbon atoms in up to 10 parts of a diluent which has 1 to 4 carbon atoms per molecule and is liquid at the polymerization temperature, by adding thereto a solution of an aluminum halide catalyst in a low-freezing, non-complex forming organic solvent which is liquid at the reaction temperature to form a slurry of solid polymer particles in reaction liquid at a temperature between −40° C. and −160° C., withdrawing the slurry from the reaction zone, mixing it with a precooled solution of an extender oil in the reaction diluent, and discharging it into well-agitated water heated to a temperature of 100° to 180° F. and containing zinc stearate, in order to flash off the volatile reaction liquids and form a slurry of finely divided polymer particles in water, and separating the polymer particles from the water slurry.

References Cited in the file of this patent

UNITED STATES PATENTS

| | | |
|---|---|---|
| 2,160,996 | Wiezevich | June 6, 1939 |
| 2,379,236 | Jenkins | June 26, 1945 |
| 2,607,763 | Hipkin et al. | Aug. 19, 1952 |